(12) United States Patent
Hong et al.

(10) Patent No.: US 9,075,439 B2
(45) Date of Patent: Jul. 7, 2015

(54) DISPLAY APPARATUS FOR SENSING TOUCH AND PROVIDING AN ELECTRO-TACTILE FEELING AND A METHOD OF DRIVING THE SAME

(71) Applicant: Samsung Display Co., Ltd., Gyeonggi-do (KR)

(72) Inventors: Won-ki Hong, Gyeonggi-do (KR); Kangwon Lee, Seoul (KR); Seungho Nam, Gyeonggi-do (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 111 days.

(21) Appl. No.: 13/840,385

(22) Filed: Mar. 15, 2013

(65) Prior Publication Data

US 2014/0146005 A1    May 29, 2014

(30) Foreign Application Priority Data

Nov. 27, 2012   (KR) ......................... 10-2012-0135378

(51) Int. Cl.
*G06F 3/01* (2006.01)
*G06F 3/044* (2006.01)
*G06F 3/041* (2006.01)

(52) U.S. Cl.
CPC .............. *G06F 3/016* (2013.01); *G06F 3/044* (2013.01); *G06F 3/0416* (2013.01)

(58) Field of Classification Search
CPC . G06F 3/016; G06F 3/0488; G06F 2203/013; G06F 2203/014

USPC ............ 345/156, 173–175; 178/18.01–18.07, 178/19.01–19.05
See application file for complete search history.

(56) References Cited

U.S. PATENT DOCUMENTS

| | | | |
|---|---|---|---|
| 6,118,435 A * | 9/2000 | Fujita et al. .................... | 345/173 |
| 2009/0017467 A1 | 1/2009 | Laemmle et al. | |
| 2009/0167508 A1* | 7/2009 | Fadell et al. ............... | 340/407.2 |
| 2010/0017179 A1 | 1/2010 | Wasynczuk et al. | |
| 2010/0151426 A1 | 6/2010 | Tachi et al. | |
| 2010/0153845 A1 | 6/2010 | Gregorio et al. | |
| 2010/0156818 A1 | 6/2010 | Burrough et al. | |
| 2010/0171719 A1 | 7/2010 | Craig et al. | |
| 2010/0172080 A1 | 7/2010 | Bestle | |
| 2011/0018695 A1* | 1/2011 | Bells et al. ................. | 340/407.2 |
| 2011/0248930 A1* | 10/2011 | Kwok et al. .................... | 345/173 |
| 2011/0248962 A1 | 10/2011 | Poupyrev et al. | |

(Continued)

FOREIGN PATENT DOCUMENTS

| | | |
|---|---|---|
| JP | 2001-285679 | 10/2001 |
| JP | 2004-319255 | 11/2004 |

(Continued)

*Primary Examiner* — Ricardo L Osorio
(74) *Attorney, Agent, or Firm* — F. Chau & Associates, LLC

(57) ABSTRACT

A touch tactile display apparatus includes a display panel and a tactile touch portion. The tactile touch portion is configured to sense a touch by a user and provide an electro-tactile feeling to an area in which the touch is sensed. The tactile touch portion includes a first electrode, a touch processor and a tactile processor. The touch processor applies a first signal to the first electrode to extract a touch coordinate. The tactile processor applies a second signal different from the first signal to the first electrode to provide the electro-tactile feeling. The first signal and the second signal are applied at different times.

19 Claims, 13 Drawing Sheets

(56) References Cited

U.S. PATENT DOCUMENTS

| | | |
|---|---|---|
| 2011/0261021 A1 | 10/2011 | Modarres et al. |
| 2011/0279380 A1* | 11/2011 | Weber et al. .................. 345/173 |
| 2012/0075198 A1* | 3/2012 | Sulem et al. .................. 345/173 |
| 2012/0105333 A1 | 5/2012 | Maschmeyer et al. |
| 2012/0113021 A1 | 5/2012 | Liu et al. |
| 2012/0154318 A1 | 6/2012 | Aono |
| 2012/0256848 A1* | 10/2012 | Madabusi Srinivasan .... 345/173 |
| 2014/0049483 A1* | 2/2014 | Kim .............................. 345/173 |
| 2014/0055377 A1* | 2/2014 | Kim .............................. 345/173 |
| 2014/0145970 A1* | 5/2014 | Cho .............................. 345/173 |

FOREIGN PATENT DOCUMENTS

| | | |
|---|---|---|
| JP | 2009-070023 | 4/2009 |
| JP | 2011-002926 | 1/2011 |
| JP | 2012-048547 | 3/2012 |
| KR | 1020090041793 | 4/2009 |

* cited by examiner

DISPLAY APPARATUS FOR SENSING TOUCH AND PROVIDING AN ELECTRO-TACTILE FEELING AND A METHOD OF DRIVING THE SAME

CROSS-REFERENCE TO RELATED APPLICATION

This U.S. non-provisional patent application claims priority under 35 U.S.C. §119 to Korean Patent Application No. 10-2012-0135378, filed on Nov. 27, 2012, the disclosure of which is incorporated by reference herein in its entirety.

TECHNICAL FIELD

The present inventive concept relates to display apparatuses for sensing touch and providing an electro-tactile feeling and methods of driving the same.

DISCUSSION OF THE RELATED ART

Information display apparatuses may use a keypad as an input means. Recently, miniaturized information display apparatuses use a touch screen panel as an input means to provide a large sized display screen. A touch screen panel may be classified as a resistive touch screen, a capacitive touch screen, a surface acoustic wave (SAW) touch screen and an infrared light touch screen. The capacitive touch screen employs a method in which two electrodes and a capacitor formed by the two electrodes are provided. In this method, a capacitance change of the capacitor caused by a touch is sensed to check whether or not there is a touch and, in the case there is a touch, a corresponding touch coordinate is extracted.

An electro-tactile technology, which provides an electro-tactile feeling to human skin by using an electric field, has been developed. The electro-tactile technology forms an electric field at a tangoreceptor located on the skin, so that a user senses a tactile feeling.

A television sized display apparatus that can provide an electro-tactile feeling in concurrence with sensing a touch is also being studied.

However, to sense a touch in a capacitive touch screen, a plurality of touch electrodes is provided and to provide an electro-tactile feeling to a user, a plurality of tactile electrodes is provided. For example, in a display panel, the touch electrode, a first insulating substrate, the tactile electrode and a second insulating substrate may be arranged in order.

If assuming that a touch by a user occurs on the second insulating substrate, to sense the touch, a capacitance change of capacitor formed between the touch electrodes by a user is to be sensed. However, since the tactile electrode is disposed on the touch electrode, the effect of the user on the touch electrode is blocked. Consequently, the capacitance change is not sensed and thereby the touch is not sensed.

SUMMARY

An exemplary embodiment of the inventive concept provides a touch tactile display apparatus. The touch tactile display apparatus may include a display panel configured to display an image in a frame section; and a tactile touch portion configured to sense a touch by a user and provide an electro-tactile feeling to an area in which the touch is sensed. The tactile touch portion comprises drive electrodes spaced apart from each other; sensing electrodes spaced apart from the drive electrodes, wherein capacitors are formed between the sensing electrodes and each of their adjacent drive electrodes; a touch processor configured to sense an amount of change of capacitance of the capacitors to obtain a touch coordinate; and a tactile processor configured to receive the touch coordinate from the touch processor, provide a first tactile signal to a drive electrode corresponding to the touch coordinate and provide a second tactile signal different from the first tactile signal to the rest of the drive electrodes and the sensing electrodes.

The touch processor may include a signal providing portion configured to provide a touch signal to the drive electrodes; and a signal processing portion configured to provide a reference signal to the sensing electrodes and sense the amount of change of capacitance of the capacitors on the basis of the reference signal to obtain the touch coordinate.

The touch signal and the reference signal may be applied before the first and second tactile signals are applied.

The frame section may include a scanning section in which a frame image is sequentially output; and a holding section in which the outputted frame image is held.

The holding section may include a first section and a second section in order, wherein the touch signal and the reference signal are applied during the first section and wherein the first and second tactile signals are applied during the second section.

The touch signal and the reference signal may be applied during the scanning section and wherein the first tactile signal and the second tactile signal are applied during the holding section.

The drive electrodes and the sensing electrodes may be provided on the same layer.

The tactile touch portion may further include an insulating substrate provided on the display panel and wherein the drive electrodes and the sensing electrodes are provided on the insulating substrate and are disposed between the insulating substrate and the display panel.

The display panel may include a first substrate including a plurality of pixel areas; a second substrate facing the first substrate; and a black matrix which is disposed on the second substrate and overlaps the pixel areas, wherein the drive electrodes and the sensing electrodes are disposed on the black matrix and are overlapped by the black matrix.

The display panel may include a first substrate; and a second substrate facing the first substrate, wherein the drive electrodes and the sensing electrodes are provided on the second substrate and are disposed between the second substrate and the first substrate.

The drive electrodes may be arranged in a matrix form of i×j (i and j are natural numbers).

The sensing electrodes may be provided i in number, extend in a column direction and be alternately disposed with the drive electrodes in a row direction.

The touch tactile display apparatus may further include a ground electrode to which a ground voltage is applied, wherein the ground electrode is disposed between drive electrodes of a drive electrode column and a sensing electrode that does not form a capacitor with the drive electrodes of the drive electrode column.

A difference between the first tactile signal and the second tactile signal may be more than 100V.

The first tactile signal may have a positive voltage value and the second tactile signal may have a voltage value of 0V.

The first tactile signal may have a positive voltage value and the second tactile signal may have a negative voltage value.

An exemplary embodiment of the inventive concept provides a touch tactile display apparatus. The touch tactile display apparatus may include a display panel configured to display an image in a frame section; and a tactile touch portion configured to sense a touch by a user and effectuate an electro-tactile feeling to an area in which the touch is sensed, wherein the tactile touch portion comprises: self sensing electrodes which are spaced apart from each other and form capacitors between neighboring electrodes; a touch processor configured to sense an amount of change of capacitance of the capacitors to obtain a touch coordinate; and a tactile processor configured to receive the touch coordinate from the touch processor, provide a first tactile signal to a self sensing electrode corresponding to the touch coordinate and provide a second tactile signal different from the first tactile signal to the rest of the self sensing electrodes.

An exemplary embodiment of the inventive concept provides a method of driving a touch tactile display apparatus. The method may include displaying an image in a display area; determining whether a user has touched the display area; obtaining a touch coordinate in response to the touch; and providing an electro-tactile feeling and an image corresponding to the touch coordinate to the user.

The touch coordinate may be obtained by applying a first signal to a first electrode and the electro-tactile feeling may be provided to the user by applying a second signal different from the first signal to the first electrode.

After the first signal is applied, the second signal may be applied.

BRIEF DESCRIPTION OF THE DRAWINGS

The above and other features of the inventive concept will become more apparent by describing in detail exemplary embodiments thereof with reference to the accompanying drawings.

DETAILED DESCRIPTION OF EXEMPLARY EMBODIMENTS

Figure 1:
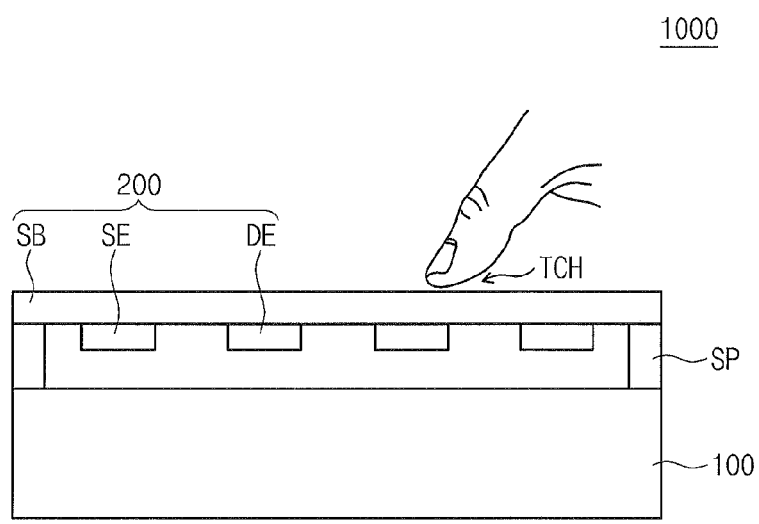
FIG. 1 is a cross sectional view of a touch tactile display apparatus in accordance with an exemplary embodiment of the inventive concept.

Exemplary embodiments of inventive concept will be described more fully hereinafter with reference to the accompanying drawings. This inventive concept may, however, be embodied in many different forms and should not be construed as limited to the embodiments set forth herein. In the drawings, the size and relative sizes of layers and regions may be exaggerated for clarity. Like numbers may refer to like elements throughout the specification and drawings.

FIG. 1 is a cross sectional view of a touch tactile display apparatus 1000 in accordance with an exemplary embodiment of the inventive concept.

Referring to FIG. 1, the touch tactile display apparatus 1000 includes a display panel 100 and a tactile touch portion 200.

The display panel 100 displays an image by a frame section unit. The display panel 100 may include various display panel types such as a liquid crystal display panel, an organic light emitting display panel, a plasma display panel, an electrophoretic display panel, an electrowetting display panel and an embedded microcavity display panel. As an example, the display panel 100 is hereinafter referred to as a liquid crystal display panel.

The tactile touch portion 200 is included in the display panel 100 to sense a touch TCH by a user and then provide an electro-tactile feeling (or feedback) to an area of the display panel 100 where the touch TCH was sensed.

The tactile touch portion 200 includes an insulating substrate SB, drive electrodes DE and sensing electrodes SE.

The insulating substrate SB may be formed from a transparent insulating material.

The drive electrodes DE and the sensing electrodes SE may be disposed under the insulating substrate SB. The drive electrode DE and the sensing electrode SE may be provided to be plural in number and are spaced apart from each other. The sensing electrodes SE form capacitors between respective drive electrodes DE.

The touch tactile display apparatus 1000 may further include a spacer SP. The spacer SP is disposed between the insulating substrate SB and the display panel 100 to maintain a space between the insulating substrate SB and the display panel 100.

Although not illustrated in FIG. 1, the touch tactile display apparatus 1000 may further include an insulating layer between the display panel 100 and the tactile touch portion 200. The insulating layer may block the effect of an electric field formed between the drive electrodes DE and the sensing electrodes SE on the display panel 100.

Figure 2:
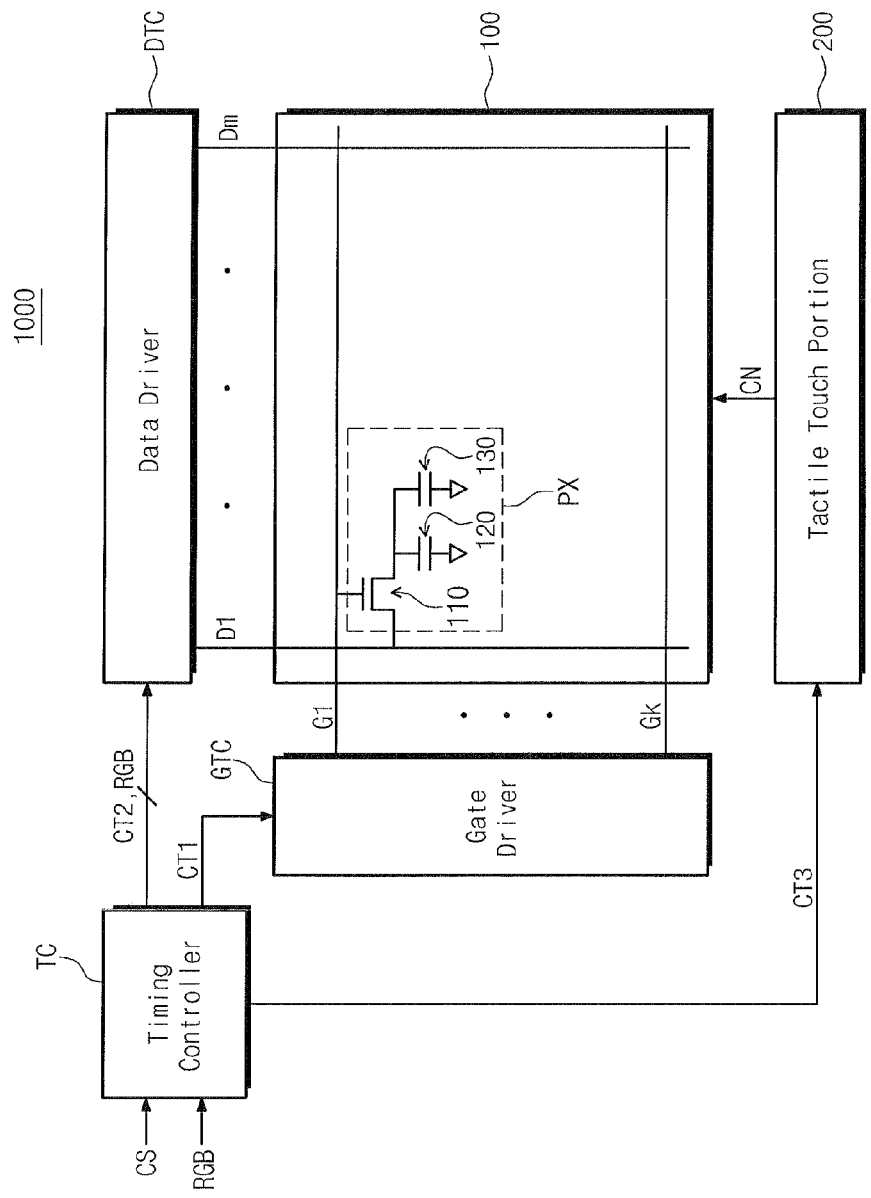
FIG. 2 is a block diagram of the touch tactile display apparatus of FIG. 1, according to an exemplary embodiment of the inventive concept.

FIG. 2 is a block diagram of the touch tactile display apparatus 1000 of FIG. 1, according to an exemplary embodiment of the inventive concept.

Referring to FIG. 2, the display panel 100 includes a plurality of gate lines G1-Gk for receiving a gate signal and a plurality of data lines D1-Dm for receiving a data voltage. The gate lines G1-Gk and the data lines D1-Dm cross one another and are insulated from one another. A plurality of pixel areas arranged in a matrix form is defined in the display panel 100 and a plurality of pixels is included in the plurality of pixel areas. In FIG. 2, an equivalent circuit of one pixel PX among the pixels is illustrated as an example. The pixel PX includes a thin film transistor 110, a liquid crystal capacitor 120 and a storage capacitor 130.

As illustrated in FIG. 2, the thin film transistor 110 includes a gate electrode, a source electrode and a drain electrode. The gate electrode is connected to the first gate line G1 among the gate lines G1-Gk. The source electrode is connected to the first data line D1 among the data lines D1-Dm. The drain electrode is connected to the liquid crystal capacitor 120 and the storage capacitor 130. The liquid crystal capacitor 120 and the storage capacitor 130 are connected to the drain electrode in parallel.

The display panel 100 includes a first display substrate, a second display substrate facing the first display substrate and a liquid crystal layer disposed between the first display substrate and the second display substrate.

The gate lines G1-Gk, the data lines D1-Dm, the thin film transistor 110 and a pixel electrode (not shown) are formed in the first display substrate. The thin film transistor 110 applies the data voltage to the pixel electrode in response to the gate signal.

A common electrode (not shown) is formed in the second display substrate and a reference voltage is applied to the common electrode. The liquid crystal layer performs a dielectric function between the pixel electrode and the common electrode. The liquid crystal capacitor 120 is charged with a voltage corresponding to an electric potential difference between the data voltage and the reference voltage.

The touch tactile display apparatus 1000 may further include a timing controller TC, a gate driver GTC and a data driver DTC.

The timing controller TC receives an image signal RGB and a control signal CS from an external graphic controller (not shown).

The timing controller TC receives the control signal CS, for example, a vertical synchronizing signal, a horizontal synchronizing signal, a main clock, a data enable signal, etc. to output a first control signal CT1, a second control signal CT2 and a third control signal CT3.

The first control signal CT1 is a gate control signal for controlling an operation of the gate driver GTC. The first control signal CT1 may include a gate clock and a vertical start signal.

The second control signal CT2 is a data control signal for controlling an operation of the data driver DTC. The second control signal CT2 may include a horizontal start signal for starting an operation of the data driver DTC, a reverse signal for reversing a polarity of the data voltage and an output directing signal for determining a time that the data voltage is to be output from the data driver DTC.

The third control signal CT3 is a signal for controlling an operation of the tactile touch portion 200. The third control signal CT3 may include a signal for determining an output time of a signal to be applied to the drive electrodes DE and the sensing electrodes SE illustrated in FIG. 1.

The gate driver GTC is electrically connected to the gate lines G1-Gk included in the display panel 100 to provide a gate signal to the gate lines G1-Gk. The gate driver GTC generates the gate signal for driving the gate lines G1-Gk on the basis of the first control signal CT1 and sequentially outputs the generated gate signal to the gate lines G1-Gk.

The data driver DTC outputs a data voltage into which the image signal RGB is converted to the data lines D1-Dm on the basis of the second control signal CT2.

The tactile touch portion 200 provides a touch coordinate signal CN having information about a touch coordinate to the display panel 100. The display panel 100 receives the touch coordinate signal CN and changes an image to display information corresponding to the touch coordinate.

Figure 3:
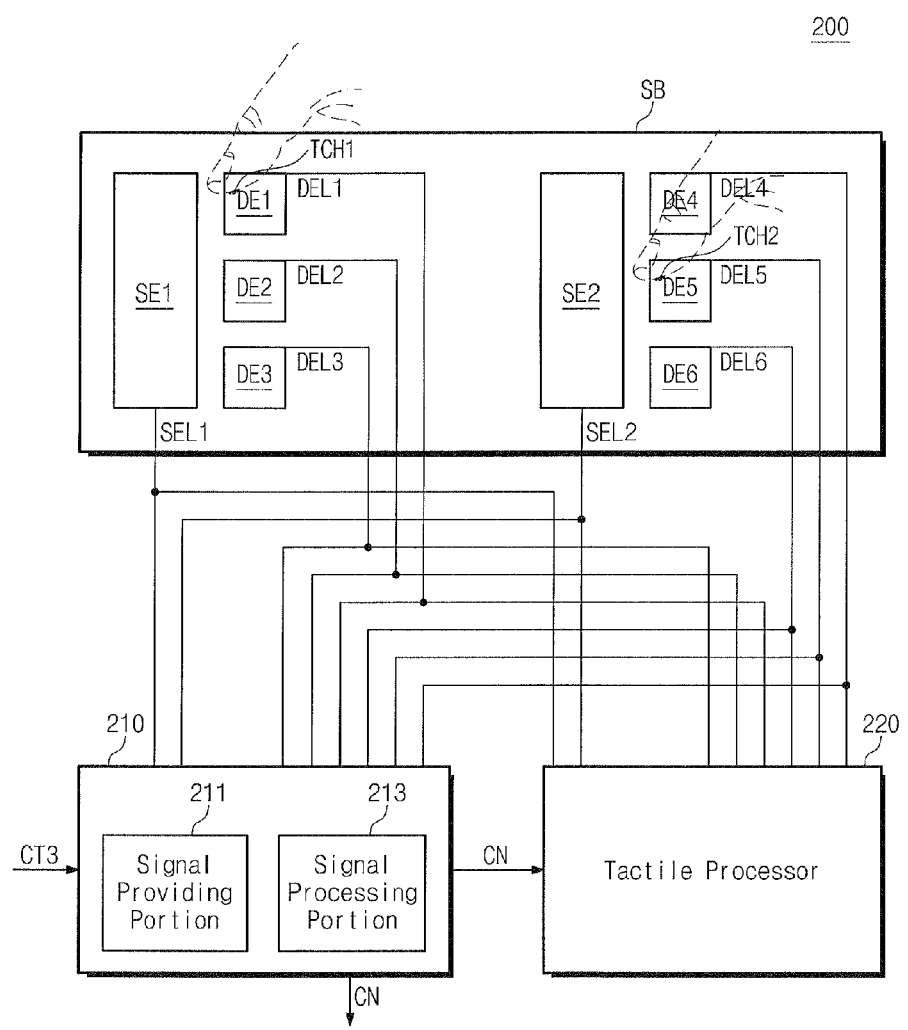
FIG. 3 is a top plan view illustrating a tactile touch portion illustrated in FIG. 1, according to an exemplary embodiment of the inventive concept.

FIG. 3 is a top plan view illustrating the tactile touch portion 200 illustrated in FIG. 1, according to an exemplary embodiment of the inventive concept. In FIG. 3, as an example, a first touch TCH1 and a second touch TCH2 are made by a user. The first touch TCH1 is made on a first drive electrode DE1 and the second touch TCH2 is made on a fifth drive electrode DE5.

Referring to FIG. 3, drive electrodes DE1-DE6 may be provided on the insulating substrate SB in a matrix form of i×j (i and j are natural numbers). In FIG. 3, the drive electrodes DE1-DE6 are provided in a matrix form of 2×3 and each of the drive electrodes DE1-DE6 has a rectangular or square shape when viewed from a top plan view.

The number of the sensing electrodes SE1 and SE2 provided on the insulating substrate SB may be i. In FIG. 3, as an example, the number of the sensing electrodes SE1 and SE2 is two. The sensing electrodes SE1 and SE2 have a shape extending in a column direction. However, the sensing electrodes SE1 and SE2 may have a shape extending in a row direction.

The sensing electrodes SE1 and SE2 and the drive electrodes DE1-DE6 are disposed alternately with respect to each other in a row direction.

The sensing electrodes SE1 and SE2 and the drive electrodes DE1-DE6 are formed on a same layer.

The tactile touch portion 200 may further include a touch processor 210 and a tactile processor 220.

The tactile touch portion 200 may further include drive interconnections DEL1-DEL6 and sensing interconnections SEL1 and SEL2 provided on the insulating substrate SB. Each of the drive electrodes DE1-DE6 is connected to the touch processor 210 and the tactile processor 220 by a respective one of the drive interconnections DEL1-DEL6.

Each of the sensing electrodes SE1 and SE2 is connected to the touch processor 210 and the tactile processor 220 by a respective one of the sensing interconnections SEL1 and SEL2.

Drive interconnections connected to an nth (n is a natural number satisfying i≤n≤j) drive electrode column may be disposed between the nth drive electrode column and an n+1th sensing electrode. The drive electrode column is defined by a plurality of drive electrodes sharing one column. In FIG. 3, the drive interconnections DEL1-DEL3 connected to a first drive electrode column DE1-DE3 are disposed between the first drive electrode column DE1-DE3 and the second sensing electrode SE2. The drive interconnections DEL1-DEL6 may extend in a row direction from the drive electrodes DE1-DE6 and in a column direction toward the touch processor 210 and tactile processor 220.

The touch processor 210 includes a signal providing portion 211 and a signal processing portion 213.

The signal providing portion 211 provides a touch signal to the drive electrodes DE1-DE6. The signal processing portion 213 provides a reference signal to the sensing electrodes SE1 and SE2 and senses the amount of change of capacitance of capacitors disposed between the drive electrodes DE1-DE6 and the sensing electrodes SE1 and SE2 on the basis of the reference signal to extract a touch coordinate.

The touch processor 210 provides the touch coordinate signal CN having information about the touch coordinate to the display panel 100 of FIG. 2 and the tactile processor 220.

The tactile processor 220 provides a first tactile signal to the drive electrode corresponding to the touch coordinate and provides a second tactile signal different from the first tactile signal to the rest of the drive electrodes and the sensing electrodes.

A user can sense an electro-tactile feeling along with an image corresponding to the touch coordinate on the basis of the first tactile signal and the second tactile signal.

Figure 4:
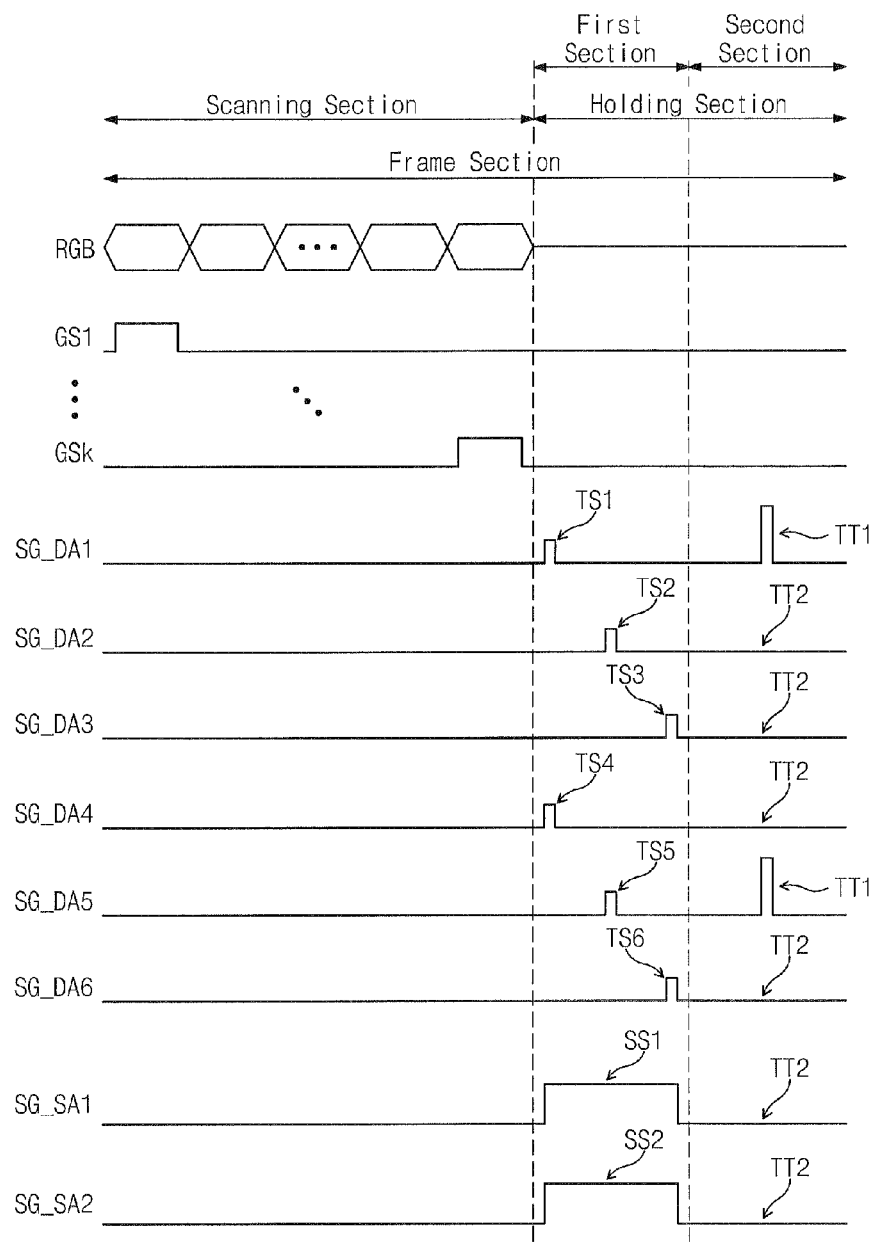
FIG. 4 is a timing diagram illustrating an image signal, gate signals, signals applied to drive electrodes and signals applied to sensing electrodes in a touch tactile display apparatus in accordance with an exemplary embodiment of the inventive concept.

FIG. 4 is a timing diagram illustrating an image signal RGB, gate signals GS1-GSk, signals SG_DA1-SG_DA6 applied to drive electrodes and signals SG_SA1 and SG_SA2 applied to sensing electrodes in a touch tactile display apparatus in accordance with an exemplary embodiment of the inventive concept.

Referring to FIGS. 3 and 4, a frame section is set up which displays one frame image.

The frame section includes a scanning section in which the frame image is sequentially output and a holding section in which the outputted frame image is held. The scanning section may be larger than the holding section.

The gate signals GS1-GSk are sequentially output to the gate lines G1-Gk during the scanning section. The image signal RGB corresponding to one frame is output to the data lines D1-Dm during the scanning section. In other words, when the kth gate signal GSk is applied to the kth gate line Gk and thereby pixels connected to the kth gate line Gk are charged with a data voltage, a complete frame image is displayed on the whole pixel.

During the holding section, the image signal RGB and the gate signals GS1-GSk are not applied.

The holding section includes a first section and a second section in order.

The signals SG_DA1-SG_DA6 applied to the drive electrodes DE1-DE6 include touch signals TS1-TS6 applied during the first section and a tactile signal applied during the second section.

The signals SG_SA1 and SG_SA2 applied to the sensing electrodes SE1 and SE2 include reference signals SS1 and SS2 applied during the first section and a tactile signal applied during the second section.

The signal providing portion 211 provides the touch signals TS1-TS6 to the drive electrodes DE1-DE6 through the drive interconnections DEL1-DEL6 during the first section.

The touch signals TS1~TS6 may be sequentially applied in a column direction or row direction of the drive electrodes DE1-DE6. In FIG. 4, the touch signals TS1-TS6 are sequentially applied in a column direction and a row direction of the drive electrodes DE1-DE6 at the same time.

The touch signals TS1-TS6 may be a voltage signal and have a pulse width such that at least one drive electrode column DE1-DE3 can be scanned during the first section.

The reference signals SS1 and SS2 may be a voltage signal and are uniformly applied to the sensing electrodes SE1 and SE2 during the first section.

The signal processing portion 213 senses the amount of change of capacitance of capacitors disposed between the drive electrodes DE1-DE6 and the sensing electrodes SE1 and SE2 generated by a user's touch to extract a touch coordinate.

In FIG. 3, if the first touch TCH1 occurs, a touch capacitor is generated between a user's finger and the first drive electrode DE1. The touch capacitor is connected to a capacitor formed between the first sensing electrode SE1 and the first drive electrode DE1 in parallel. Thus, capacitance of the capacitor formed between the first sensing electrode SE1 and the first drive electrode DE1 is changed and the signal processing portion 213 senses the amount of change of capacitance of that capacitor to extract a touch coordinate. The signal processing portion 213 can directly sense the change of capacitance of the capacitor formed between the first sensing electrode SE1 and the first drive electrode DE1 but the inventive concept is not limited thereto. For example, the signal processing portion 213 can extract the touch coordinate using a time constant change value caused by the change of capacitance of the capacitor formed between the first sensing electrode SE1 and the first drive electrode DE1.

The tactile signal may include a first tactile signal TT1 and a second tactile signal TT2.

The first tactile signal TT1 is a signal applied to a drive electrode corresponding to the touch coordinate. In FIG. 4, the first tactile signal TT1 is applied to the first drive electrode DE1 corresponding to the first touch TCH1 and the fifth drive electrode DE5 corresponding to the second touch TCH2. As shown in FIG. 3, if the second touch TCH2 occurs, a touch capacitor is generated between a user's finger and the fifth drive electrode DE5. The touch capacitor is connected to a capacitor formed between the second sensing electrode SE2 and the fifth drive electrode DE5 in parallel. Thus, capacitance of the capacitor formed between the second sensing electrode SE2 and the fifth drive electrode DE5 is changed and the signal processing portion 213 senses the amount of change of capacitance of that capacitor to extract a touch coordinate.

The first tactile signal TT1 may have a positive voltage value. The first tactile signal TT1 may have a voltage greater than the touch signals TS1-TS6. For example, if voltage values of the touch signals TS1-TS6 are less than 10V, the first tactile signal TT1 may have a value of 100V or more.

The second tactile signal TT2 is applied to electrodes to which the first tactile signal TT1 is not applied among the drive electrodes DE1-DE6 and the sensing electrodes SE1 and SE2. In FIG. 4, the second tactile signal TT2 is applied to the drive electrodes DE2, DE3, DE4 and DE6 and the sensing electrodes SE1 and SE2 except the first drive electrode DE1 and the fifth drive electrode DE5.

In the present embodiment, the second tactile signal TT2 may be a voltage signal of 0V. The first tactile signal TT1 and the second tactile signal TT2 may be applied at the same timing in the second section. This is possible because the drive electrodes DE1-DE6 and the sensing electrodes SE1 and SE2 are connected to the tactile processor 220 through different interconnections from one another.

A user can sense a tactile feeling due to a tactile electric field formed between an electrode to which the first tactile signal TT1 is applied and an electrode to which the second tactile signal TT2 is applied. A tactile electric field is formed between the first drive electrode DE1 to which the first tactile signal TT1 is applied and peripheral electrodes (e.g., SE1, DE2 and SE2) to which the second tactile signal TT2 is applied and a receptor under a user's skin senses the tactile electric field to sense the tactile feeling.

The first tactile signal TT1 and the second tactile signal TT2 may be set up so that an electro-tactile feeling and an image corresponding to the touch coordinate are transmitted to a user. For example, if an image corresponding to a touch coordinate of the first touch TCH1 indicates an apple, the first tactile signal TT1 and the second tactile signal TT2 may be set up so that an electro-tactile feeling and an image of a real apple are transmitted to a user.

To achieve this, a pulse size, the number of pulses and a pulse width of the first tactile signal TT1 may be controlled.

In the touch tactile display apparatus 1000 in accordance with exemplary embodiments of the inventive concept described with reference to FIGS. 1 through 4, by dividing the holding section into the first section for sensing a touch and the second section for providing an electro-tactile feeling to a user, a touch can be sensed by the drive electrodes DE1-DE6 and the sensing electrodes SE1 and SE2 and an electro-tactile feeling can be provided to the user.

Figure 5A:
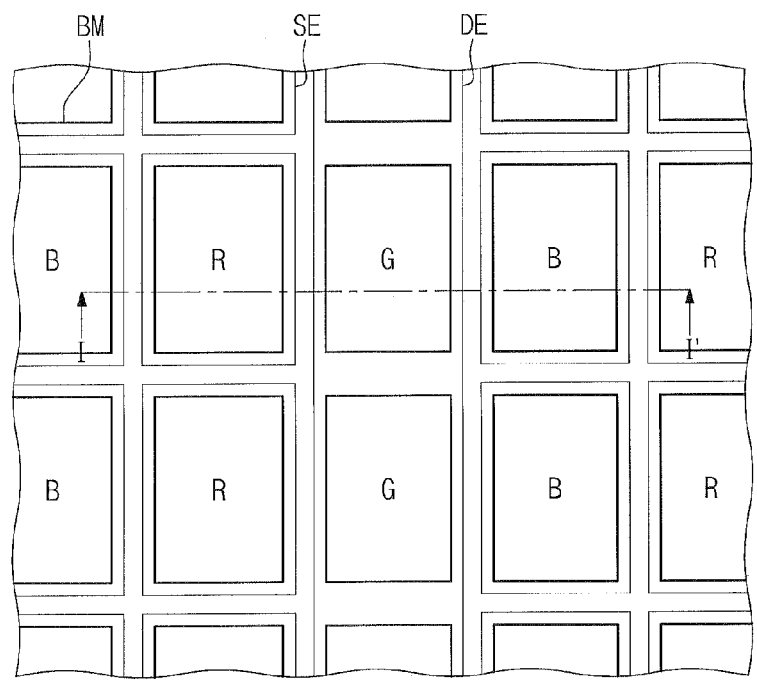
FIG. 5A is a top plan view illustrating a part of a touch tactile display apparatus in accordance with an exemplary embodiment of the inventive concept.
Figure 5B:
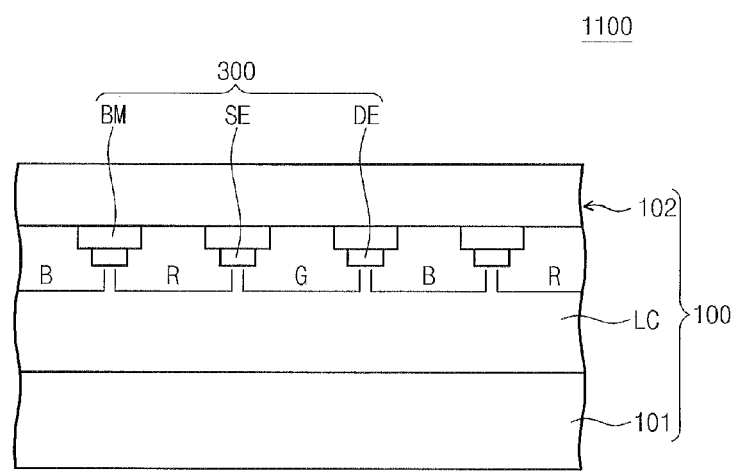
FIG. 5B is a cross sectional view taken along line I-I' of FIG. 5A.

FIG. 5A is a top plan view illustrating a part of a touch tactile display apparatus 1100 in accordance with an exemplary embodiment of the inventive concept. FIG. 5B is a cross sectional view taken along line I-I' of FIG. 5A.

Except a tactile touch portion 300, the touch tactile display apparatus 1100 illustrated in FIGS. 5A and 5B is substantially the same as the touch tactile display apparatus 1000 illustrated in FIG. 1.

Referring to FIGS. 5A and 5B, a display panel 100 includes a first display substrate 101, a second substrate 102 facing the first display substrate 101 and a liquid crystal layer LC disposed between the first display substrate 101 and the second substrate 102.

Although not illustrated in FIGS. 5A and 5B, a thin film transistor, gate lines and data lines are formed in the first display substrate 101.

The second display substrate 102 may further include a black matrix BM. When viewed from a top plan view, the black matrix BM is disposed in a lattice form to overlap the thin film transistor, the gate lines and the data lines. The black matrix BM may prevent light from leaking from the vicinity of the pixel area.

The tactile touch portion 300 includes drive electrodes DE and sensing electrodes SE.

The drive electrodes DE and the sensing electrodes SE are disposed on the black matrix BM and are covered by the black matrix BM when viewed from a top plan view. Thus, the drive electrodes DE and the sensing electrodes SE are disposed in a lattice form when viewed from a top plan view. Each of the drive electrodes DE may be provided to correspond to the plurality of pixel areas. Each of the sensing electrodes SE may be provided to correspond to the plurality of pixel areas.

The drive electrodes DE and the sensing electrodes SE may be formed of an opaque conductive material. Since the drive electrodes DE and the sensing electrodes SE are covered by the black matrix BM so as not to be exposed to the outside, even though they are opaque, they do not affect an opening ratio of a pixel. However, the inventive concept is not limited thereto. The drive electrodes DE and the sensing electrodes SE may be formed of a transparent electrode.

The second display substrate 102 may further include a color filter CF. The color filter CF may be disposed to correspond to an area zoned by the black matrix BM. The color filter CF includes a red R material, a green G material and blue B material to provide a color to light that penetrates the liquid crystal layer LC. The color filter CF may include other color materials such as cyan, magenta, yellow and black.

Although not illustrated in FIG. 5B, the second display substrate 102 may further include an insulating layer disposed under the color filter CF and a common electrode to which a reference voltage is applied.

Figure 6:
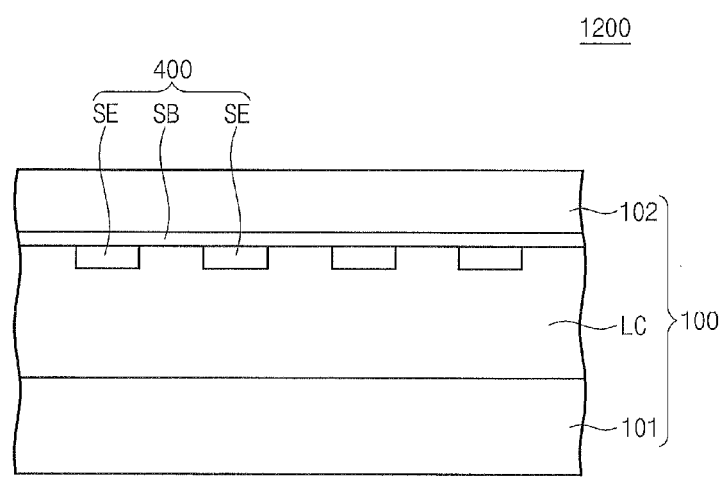
FIG. 6 is a cross sectional view of a touch tactile display apparatus in accordance with an exemplary embodiment of the inventive concept.

FIG. 6 is a cross sectional view of a touch tactile display apparatus 1200 in accordance with an exemplary embodiment of the inventive concept.

Except a tactile touch portion 400, the touch tactile display apparatus 1200 illustrated in FIG. 6 is substantially the same as the touch tactile display apparatus 1100 illustrated in FIG. 5.

The tactile touch portion 400 includes an insulating substrate SB, drive electrodes DE and sensing electrodes SE.

The insulating substrate SB is formed of a transparent insulating material and may be disposed under a second display substrate 102.

The drive electrodes DE and the sensing electrodes SE may be arranged under the insulating substrate SB.

Although not illustrated in FIG. 6, the second display substrate 102 may include a black matrix and a color filter.

Figure 7:
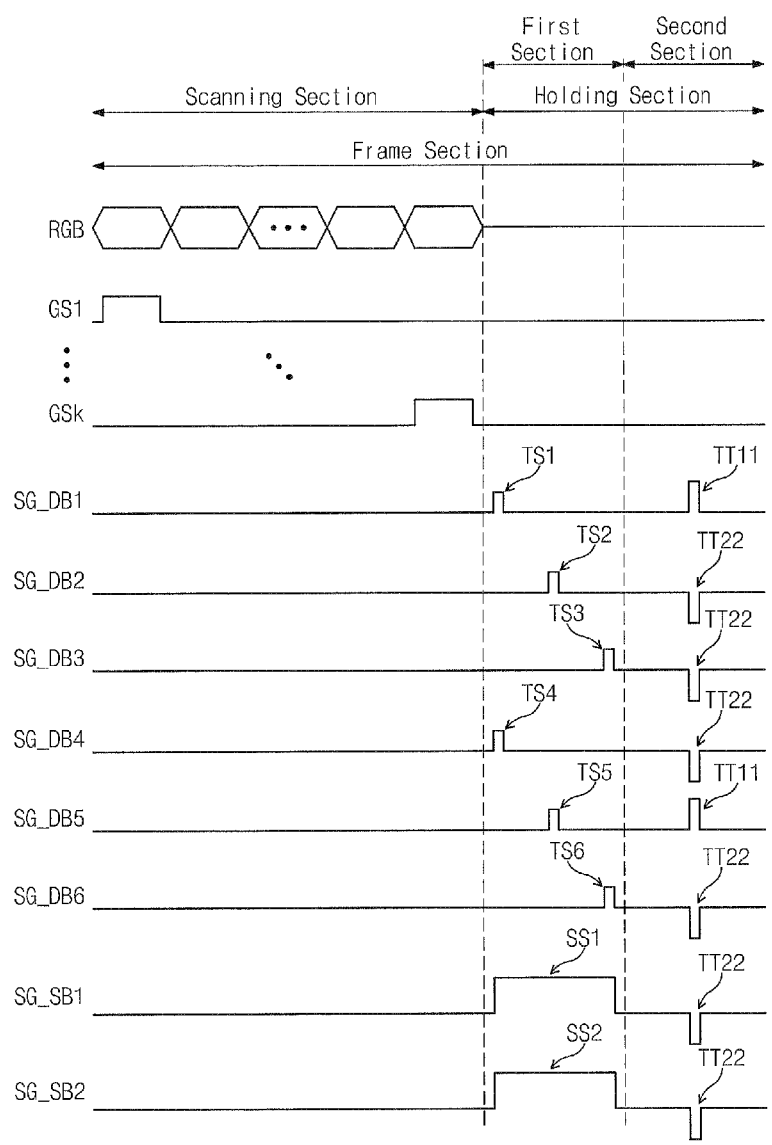
FIG. 7 is a timing diagram illustrating an image signal, gate signals, signals applied to drive electrodes and signals applied to sensing electrodes in a touch tactile display apparatus in accordance with an exemplary embodiment of the inventive concept.

FIG. 7 is a timing diagram illustrating an image signal RGB, gate signals GS1-GSk, signals SG_DB1-SG_DB6 applied to drive electrodes and signals SG_SB1 and SG_SB2 applied to sensing electrodes in a touch tactile display apparatus in accordance with an exemplary embodiment of the inventive concept.

Except a tactile signal, a touch tactile display apparatus in accordance with an exemplary embodiment of the inventive concept that will be described with reference to FIG. 7 is substantially the same as the touch tactile display apparatus described with reference to FIG. 4, for example.

The tactile signal may include a first tactile signal TT11 and a second tactile signal TT22.

The first tactile signal TT11 has a positive voltage value and the second tactile signal TT22 may have a negative voltage value. In FIG. 7, the first tactile signal TT11 and the second tactile signal TT22 have a same absolute value and a polarity opposite each other.

Although, the absolute values of the first tactile signal TT11 and the second tactile signal TT22 are different from respective absolute values of the first tactile signal TT1 and the second tactile signal TT2 shown in FIG. 4, a voltage difference between the first tactile signal and the second tactile signal according to an exemplary embodiment of the inventive concept may be the same.

For example, in an exemplary embodiment of the inventive concept, if a value of the first tactile signal TT1 is 100V and a value of the second tactile signal TT2 is 0V, the difference is 100, and in another exemplary embodiment of the inventive concept, if a value of the first tactile signal TT11 is 50V and a value of the second tactile signal TT22 is −50V, the difference is 100.

In an exemplary embodiment of the inventive concept in which a voltage value of the first tactile signal is less than that of the first tactile signal in another exemplary embodiment of the inventive concept, the amount of instantaneous voltage changes that are applied to a drive electrode can be small while providing the same electro-tactile feeling as that of the another exemplary embodiment of the inventive concept.

Figure 8:
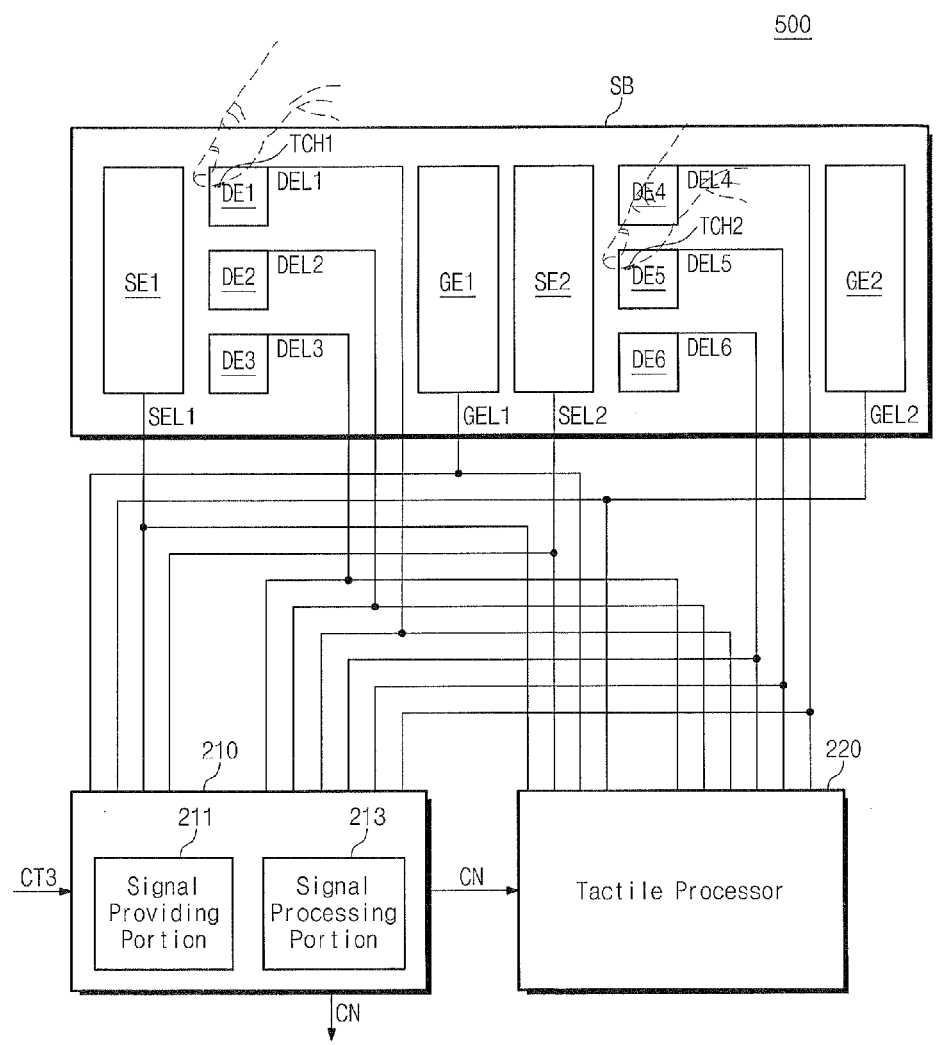
FIG. 8 is a top plan view illustrating a tactile touch portion of a touch tactile display apparatus in accordance with an exemplary embodiment of the inventive concept.

FIG. 8 is a top plan view illustrating a tactile touch portion 500 of a touch tactile display apparatus in accordance with an exemplary embodiment of the inventive concept.

Except that ground electrodes GE1 and GE2 are added to the tactile touch portion 500, the touch tactile display apparatus illustrated in FIG. 8 is substantially the same as the touch tactile display apparatus illustrated in FIG. 3, for example.

The tactile touch portion 500 may further include the ground electrodes GE1 and GE2. A ground voltage of 0 V may be applied to the ground electrodes GE1 and GE2.

The ground electrodes GE1 and GE2 may be disposed on the same layer as the drive electrodes DE1DE6 and the sensing electrodes SE1 and SE2.

The ground electrodes GE1 and GE2 may be provided to be the same in number as the number of the sensing electrodes SE1 and SE2 and may have a shape extending in a column direction. However, the ground electrodes GE1 and GE2 may have a shape extending in a row direction. The ground electrodes GE1 and GE2 may be disposed between drive electrodes of nth column (n is a natural number satisfying 1≤n≤j−1) and an n+1th sensing electrode and may be spaced apart from the drive electrodes DE1-DE6 and the sensing electrodes SE1 and SE2.

The tactile touch portion 500 may further include ground interconnections GEL1 and GEL2. The ground electrodes GE1 and GE2 are connected to the touch processor 210 and the tactile processor 220 by the respective ground interconnections GEL1 and GEL2.

In the touch tactile display apparatus of FIG. 8, a ground voltage is applied to the ground electrodes GE1 and GE2 during a first section in which a touch signal and a sensing signal are applied. Since the effect of the drive electrodes of the nth column and the n+1th sensing electrode on each other is reduced, a touch sensing function of the tactile touch portion 500 may be improved. A ground voltage is applied to the ground electrodes GE1 and GE2 during a second section in which a tactile signal is applied, so that the ground electrodes GE1 and GE2 function as electrodes when a second tactile signal is applied.

Figure 9:
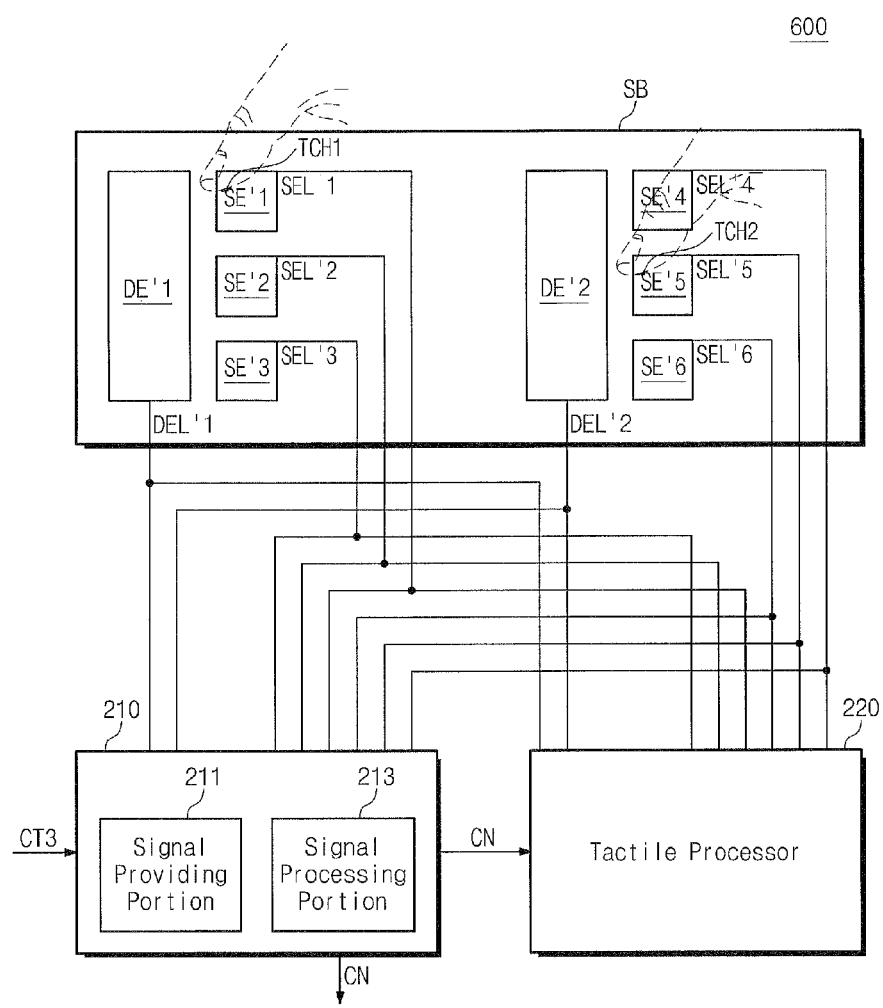
FIG. 9 is a top plan view illustrating a tactile touch portion of a touch tactile display apparatus in accordance with an exemplary embodiment of the inventive concept.
Figure 10:
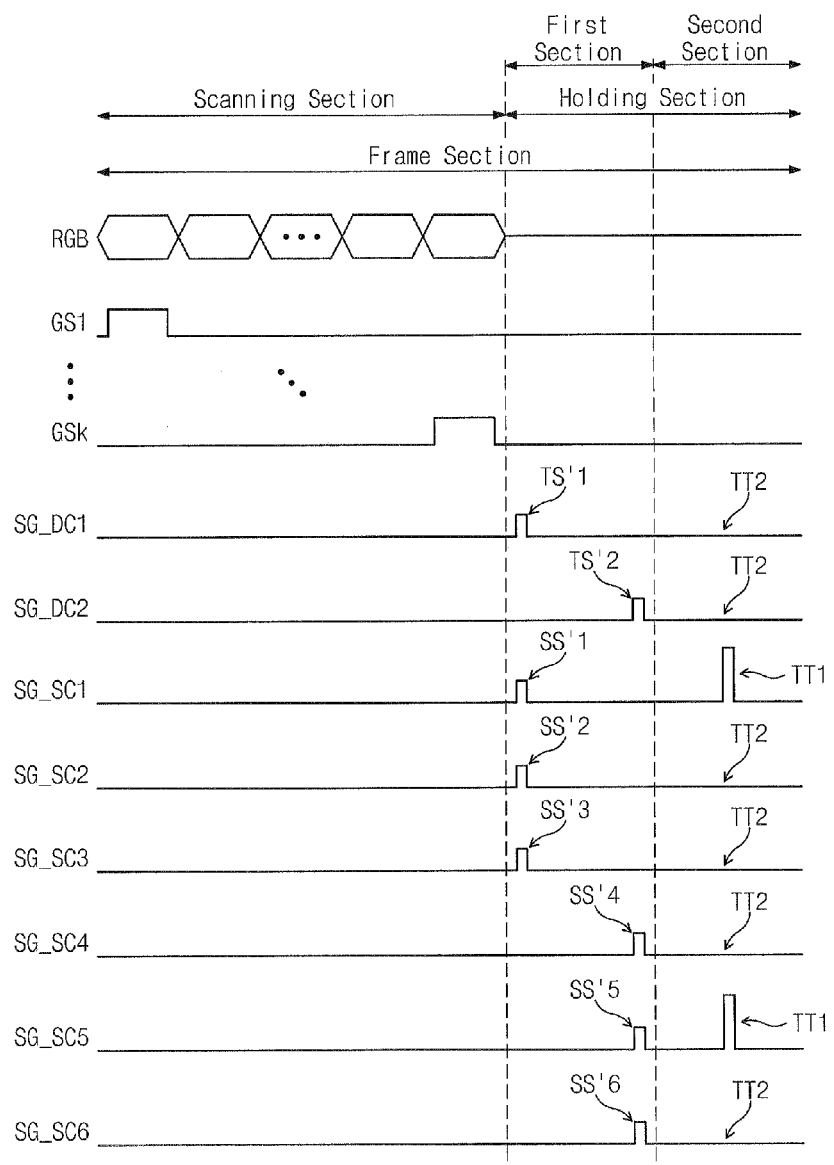
FIG. 10 is a timing diagram illustrating an image signal, gate signals, signals applied to drive electrodes and signals applied to sensing electrodes in the touch tactile display apparatus of FIG. 9, according to an exemplary embodiment of the inventive concept.

FIG. 9 is a top plan view illustrating a tactile touch portion 600 of a touch tactile display apparatus in accordance with an exemplary embodiment of the inventive concept. FIG. 10 is a timing diagram illustrating an image signal RGB, gate signals GS1-GSk, signals SG_DC1 and SG_DC2 applied to drive electrodes and signals SG_SC1-SG_SC6 applied to sensing electrodes in the touch tactile display apparatus of FIG. 9.

Except that locations of sensing electrodes and drive electrodes are changed and thereby there are some differences in signals applied to drive interconnections and signals applied to sensing interconnections, the touch tactile display apparatus that will be described with reference to FIGS. 9 and 10 is substantially the same as that described with reference to FIG. 3, 4, 7 or 8, for example.

As shown in FIG. 9, sensing electrodes SE' 1-SE' 6 may be arranged on an insulating substrate SB in a matrix form of i×j (i and j are natural numbers). In FIG. 9, the sensing electrodes SE' 1-SE' 6 are arranged in a matrix form of 2×3 and each of the sensing electrodes SE' 1-SE' 6 has a rectangular or square shape when viewed from a top plan view.

As shown in FIG. 9, drive electrodes DE' 1 and DE' 2 may be i in number and may be arranged on the insulating substrate SB. In FIG. 9, the number of the drive electrodes DE' 1 and DE' 2 is two and the drive electrodes DE' 1 and DE' 2 have a shape extending in a column direction. However, the drive electrodes DE' 1 and DE' 2 may have a shape extending in a row direction.

The drive electrodes DE' 1 and DE' 2 and the sensing electrodes SE' 1-SE' 6 are alternately disposed in a row direction.

The sensing electrodes SE' 1-SE' 6 and the drive electrodes DE' 1 and DE' 2 are formed on the same layer.

The tactile touch portion 600 may further include sensing interconnections SEL' 1-SEL' 6 and drive interconnections DEL'1 and DEL' 2 arranged on the insulating substrate SB. The sensing electrodes SE' 1-SE' 6 are connected to the touch processor 210 and the tactile processor 220 by the respective sensing interconnections SEL' 1-SEL' 6.

The drive electrodes DE' 1 and DE' 2 are connected to the touch processor 210 and the tactile processor 220 by the respective drive interconnections DEL'1 and DEL' 2.

With reference to FIG. 10, the signal providing portion 211 provides touch signals TS' 1 and TS' 2 to the drive electrodes DE' 1 and DE' 2 through the drive interconnections DEL' 1 and DEL' 2 during the first section.

The touch signals TS' 1 and TS' 2 may be sequentially applied in a row direction of the drive electrodes DE' 1 and DE' 2.

The touch signals TS' 1 and TS' 2 may be a voltage signal and has a pulse width large enough such that the drive electrodes DE' 1 and DE' 2 can be scanned during the first section.

Reference signals SS' 1-SS' 6 are applied to the sensing electrodes SE' 1-SE' 6 through the sensing interconnections SEL' 1-SEL' 6 during the first section.

The reference signals SS' 1-SS' 6 are sequentially applied to the sensing electrodes SE' 1-SE' 6 in a row direction and in a column direction at the same time.

The signal processing portion 213 senses the amount of change of capacitance of capacitors disposed between the drive electrodes DE' 1 and DE' 2 and the sensing electrodes sensing electrodes SE' 1-SE' 6 generated by a user's touch to extract a touch coordinate.

Figure 11:
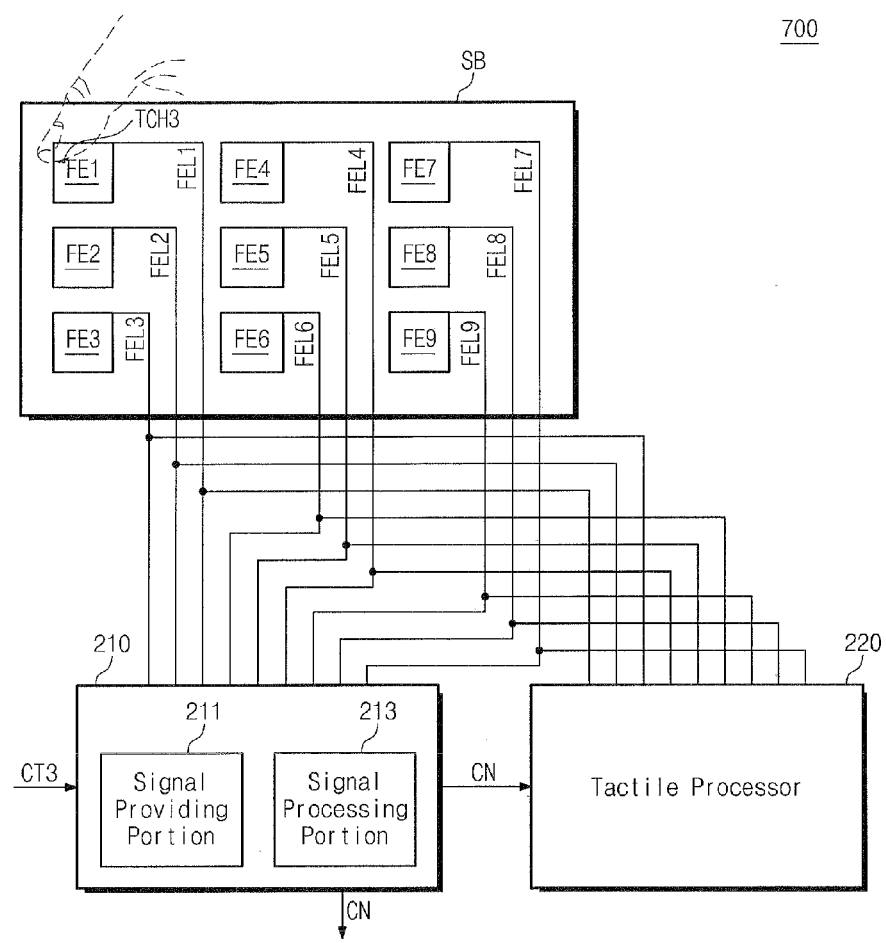
FIG. 11 is a top plan view illustrating a tactile touch portion of a touch tactile display apparatus in accordance with an exemplary embodiment of the inventive concept.

FIG. 11 is a top plan view illustrating a tactile touch portion 700 of a touch tactile display apparatus in accordance with an exemplary embodiment of the inventive concept.

Except that the tactile touch portion 700 includes one type of electrode rather than two or three, the touch tactile display apparatus that will be described with reference to FIG. 11 is substantially the same as that described for other embodiments, for example.

The tactile touch portion 700 includes an insulating substrate SB and self sensing electrodes FE1-FE9. The self sensing electrodes FE1-FE9 may be arranged on the insulating substrate SB in a matrix form of i×j (i and j are natural numbers). In FIG. 11, the self sensing electrodes FE1-FE9 are arranged in a matrix form of 3×3 and each of the self sensing electrodes FE1-FE9 has a rectangular or square shape when viewed from a top plan view.

The tactile touch portion 700 may further include self sensing interconnections FEL1-FEL9 provided on the insulating substrate SB. The self sensing electrodes FE1-FE9 are connected to the touch processor 210 and the tactile processor 220 by the respective self sensing interconnections FEL1-FEL9.

The touch processor 210 applies self sensing signals to the self sensing electrodes FE1-FE9 through the self sensing interconnections FEL1~FEL9.

The self sensing electrodes FE1-FE9 form a native capacitor between neighboring electrodes. The touch processor 210 senses the amount of change of capacitance of the native capacitor to extract a touch coordinate.

In FIG. 11, a touch TCH3 occurs on a first self sensing electrode FE1, a touch capacitor is generated between a user and the first sensing electrode FE1 and the touch capacitor is connected to the native capacitor in parallel; the native capacitor being formed by the first self sensing electrode FE1 and its neighboring electrodes. Thus, capacitance of the native capacitor is changed and the touch processor 210 senses the amount of change of capacitance of the native capacitor to extract a touch coordinate.

Figure 12:
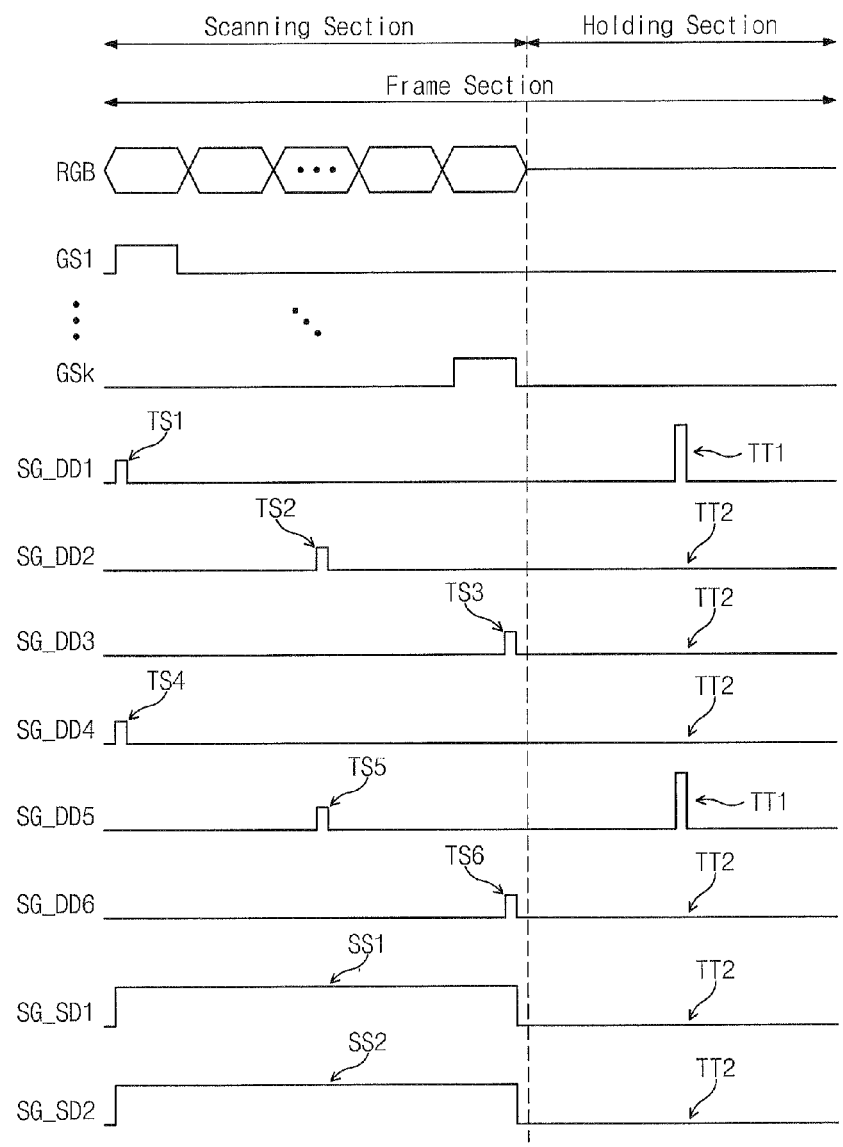
FIG. 12 is a timing diagram illustrating an image signal, gate signals, signals applied to drive electrodes and signals applied to sensing electrodes in a touch tactile display apparatus in accordance with an exemplary embodiment of the inventive concept.

FIG. 12 is a timing diagram illustrating an image signal RGB, gate signals GS1-GSk, signals SG_DD1-SG_DD6 applied to drive electrodes and signals SG_SD1 and SG_SD2 applied to sensing electrodes in a touch tactile display apparatus in accordance with an exemplary embodiment of the inventive concept.

Except that there are some difference in signals SG_DD1-SG_DD6 applied to drive interconnections and signals SG_SD1 and SG_SD2 applied to sensing interconnections, the touch tactile display apparatus that will be described with reference to FIG. 12 is substantially the same as that described for other embodiments, for example.

The signals SG_DD1-SG_DD6 applied to the drive electrodes include touch signals TS1-TS6 applied during a scanning section and a tactile signal applied during a holding section.

The signals SG_SD1 and SG_SD2 applied to the sensing electrodes include reference signals SS1 and SS2 applied during the scanning section and a tactile signal applied during the holding section.

A touch may be sensed during the scanning section in which a frame image is sequentially output and, in this case, an electro-tactile feeling is transmitted to a user during the holding section in which the displayed image is held after the frame image is output.

Since a touch signal and a reference signal for sensing a touch have a comparatively small voltage (e.g., less than about 10V), even though they are output during the scanning section, they do not distort an image being displayed. However, since a tactile signal for providing an electro-tactile feeling to a user has comparatively large voltage (e.g., more than about 100V), the tactile signal is output during the holding section so as not to distort an image being displayed.

In the case that an insulating layer is formed between a tactile touch portion and a display panel, the insulating layer may block the effect of an electric field formed between the drive electrodes and the sensing electrodes on the display panel. If the touch signal and the reference signal are applied before the first and second tactile signals are applied in the frame section, it may not be necessary to divide the scanning section and the holding section.

Figure 13:
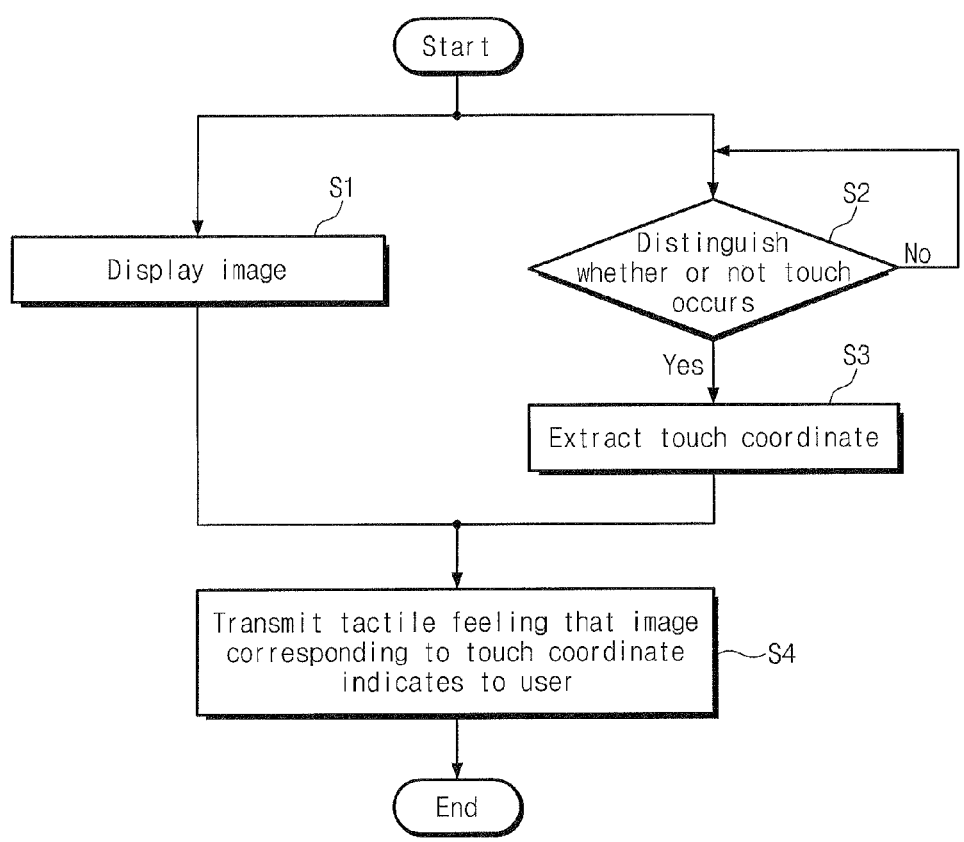
FIG. 13 is a flow chart illustrating a drive method of a touch tactile display apparatus in accordance with an exemplary embodiment of the inventive concept.

FIG. 13 is a flow chart illustrating a drive method of a touch tactile display apparatus in accordance with an exemplary embodiment of the inventive concept.

Referring to FIG. 13, an image is displayed on a display panel (S1).

It is determined whether or not a user has touched a tactile touch portion of the display panel (S2). Whether or not a touch occurs can be determined by sensing the amount of change of capacitance of a capacitor formed between a drive electrode and a sensing electrode.

If it is judged that a touch does not occur, S2 may be repeated.

If it is judged that a touch occurs, a touch coordinate is extracted (S3). The touch coordinate may be extracted by applying a first signal to a first electrode. The first electrode may include the drive electrode and the sensing electrode described with reference to FIGS. 1 through 4. The first signal may include a touch signal and a reference signal.

An electrode-tactile feeling which an image corresponding to the touch coordinate indicates is transmitted to a user (S4). For example, if the display panel displays a tree image and background, and if the user touches the display panel corresponding the tree image, the user can feel an tactile-impression of a wood. Here, the electrode-tactile feeling is transmitted to the user by applying a second signal to the first electrode. The second signal may include the first tactile signal TT1 and the second tactile signal TT2 described with reference to FIGS. 3 and 4.

The first signal and the second signal are applied to the first electrode at different times. For example, after the first signal is applied, the second signal is applied.

The second signal is a voltage pulse signal and is set up so that a tactile feeling along with an image corresponding to the touch coordinate are transmitted to a user. To achieve this, a pulse size, the number of pulses and a pulse width of the second signal may be controlled.

The touch tactile display apparatus in accordance with an exemplary embodiment of the inventive concept senses a touch by a user and provides an electro-tactile feeling to an area in which the touch is sensed. In addition, without adding a separate electrode, the effect described above can be accomplished and thereby thickness, weight and cost are reduced.

According to a method of driving the touch tactile display apparatus in accordance with an exemplary embodiment of the inventive concept, a touch by a user can be sensed and an electro-tactile feeling can be provided to a user.

While the present inventive concept has been shown and described with reference to exemplary embodiments thereof, it will be apparent to those of ordinary skill in the art that various changes in form and detail may be made thereto without departing from the scope and spirit of the inventive concept as defined by the following claims.

What is claimed is:

1. A touch tactile display apparatus, comprising:
   a display panel configured to display an image in a frame section; and
   a tactile touch portion configured to sense a touch by a user and provide an electro-tactile feeling to an area in which the touch is sensed,
   wherein the tactile touch portion comprises:
   drive electrodes spaced apart from each other;
   sensing electrodes spaced apart from the drive electrodes, wherein capacitors are formed between the sensing electrodes and each of their adjacent drive electrodes;
   a touch processor configured to sense an amount of change of capacitance of the capacitors to obtain a touch coordinate; and
   a tactile processor configured to receive the touch coordinate from the touch processor, provide a first tactile signal to a drive electrode corresponding to the touch coordinate and provide a second tactile signal different from the first tactile signal to the rest of the drive electrodes and the sensing electrodes while the first tactile signal is being provided,
   wherein the rest of the drive electrodes do not correspond to a touch coordinate.

2. The touch tactile display apparatus of claim 1, wherein the touch processor comprises:
   a signal providing portion configured to provide a touch signal to the drive electrodes; and
   a signal processing portion configured to provide a reference signal to the sensing electrodes and sense the amount of change of capacitance of the capacitors on the basis of the reference signal to obtain the touch coordinate.

3. The touch tactile display apparatus of claim 2, wherein the touch signal and the reference signal are applied before the first and second tactile signals are applied.

4. The touch tactile display apparatus of claim 1, wherein the frame section comprises:
   a scanning section in which a frame image is sequentially output; and
   a holding section in which the outputted frame image is held.

5. The touch tactile display apparatus of claim 4, wherein the holding section comprises a first section and a second section in order, wherein the touch signal and the reference signal are applied during the first section and wherein the first and second tactile signals are applied during the second section.

6. The touch tactile display apparatus of claim 4, wherein the touch signal and the reference signal are applied during the scanning section and wherein the first tactile signal and the second tactile signal are applied during the holding section.

7. The touch tactile display apparatus of claim 1, wherein the drive electrodes and the sensing electrodes are provided on the same layer.

8. The touch tactile display apparatus of claim 1, wherein the tactile touch portion further comprises an insulating substrate provided on the display panel and wherein the drive electrodes and the sensing electrodes are provided on the insulating substrate and are disposed between the insulating substrate and the display panel.

9. The touch tactile display apparatus of claim 1, wherein the display panel comprises:
- a first substrate including a plurality of pixel areas;
- a second substrate facing the first substrate; and
- a black matrix which is disposed on the second substrate and overlaps the pixel areas,
- wherein the drive electrodes and the sensing electrodes are disposed on the black matrix and are overlapped by the black matrix.

10. The touch tactile display apparatus of claim 1, wherein the display panel comprises:
- a first substrate; and
- a second substrate facing the first substrate,
- wherein the drive electrodes and the sensing electrodes are provided on the second substrate and are disposed between the second substrate and the first substrate.

11. The touch tactile display apparatus of claim 1, wherein the drive electrodes are arranged in a matrix form of i×j (i and j are natural numbers).

12. The touch tactile display apparatus of claim 11, wherein the sensing electrodes are provided i in number, extend in a column direction and are alternately disposed with the drive electrodes in a row direction.

13. The touch tactile display apparatus of claim 12, further comprising a ground electrode to which a ground voltage is applied, wherein the ground electrode is disposed between drive electrodes of a drive electrode column and a sensing electrode that does not form a capacitor with each of the drive electrodes of the drive electrode column.

14. The touch tactile display apparatus of claim 1, wherein a difference between the first tactile signal and the second tactile signal is more than 100V.

15. The touch tactile display apparatus of claim 1, wherein the first tactile signal has a positive voltage value and the second tactile signal has a voltage value of 0V.

16. The touch tactile display apparatus of claim 1, wherein the first tactile signal has a positive voltage value and the second tactile signal has a negative voltage value.

17. A touch tactile display apparatus, comprising:
- a display panel configured to display an image in a frame section; and
- a tactile touch portion configured to sense a touch by a user and effectuate an electro-tactile feeling to an area in which the touch is sensed,
- wherein the tactile touch portion comprises:
- self sensing electrodes which are spaced apart from each other and form capacitors between neighboring electrodes;
- a touch processor configured to sense an amount of change of capacitance of the capacitors to obtain a touch coordinate; and
- a tactile processor configured to receive the touch coordinate from the touch processor, provide a first tactile signal to a self sensing electrode corresponding to the touch coordinate and provide a second tactile signal different from the first tactile signal to the rest of the self sensing electrodes while the first tactile signal is being provided,
- wherein the rest of the self sensing electrodes do not correspond to a touch coordinate.

18. A method of driving a touch tactile display apparatus, comprising:
- displaying an image in a display area;
- determining whether a user has touched the display area;
- obtaining a touch coordinate in response to the touch; and
- providing an electro-tactile feeling which an image corresponding to the touch coordinate indicates to the user,
- wherein the touch coordinate is obtained by applying a first signal to a first electrode and the electro-tactile feeling is provided to the user by applying a first tactile signal to the first electrode and a second tactile signal different from the first tactile signal to a second electrode, wherein the second electrode does not correspond to a touch coordinate.

19. The method of claim 18, wherein after the first signal is applied, the first and second tactile signals are applied.

* * * * *